June 11, 1935.  J. L. CHANEY  2,004,092
DEVICE FOR INDICATING THE TEMPERATURE OF LIQUIDS
Filed Dec. 15, 1933
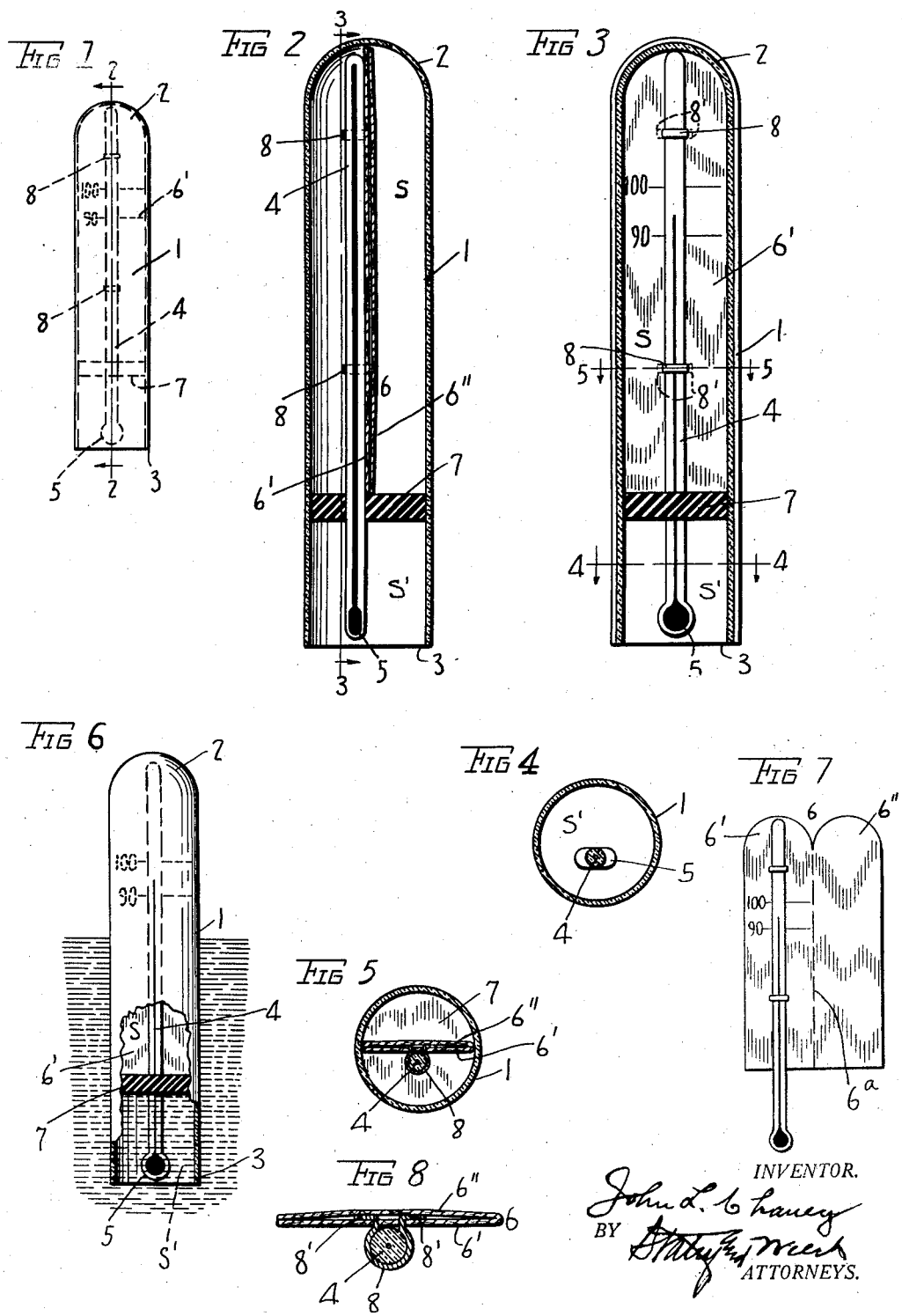

Patented June 11, 1935

2,004,092

UNITED STATES PATENT OFFICE 2,004,092

DEVICE FOR INDICATING THE TEMPERATURE OF LIQUIDS

John L. Chaney, Springfield, Ohio

Application December 15, 1933, Serial No. 702,557

6 Claims. (Cl. 73—52)

This invention relates to improvements in floating indicating devices for indicating the conditions of liquids, it more particularly relating to that class of instruments in which the indicator is so supported that when properly placed in a liquid the indicator will be held in a vertical position.

In the present instance, the indicator, such as a thermometer, is employed to determine the temperature of water, and in order that a truer indication of the average temperature of a body of liquid be given, provision is made to cause the device consisting of the thermometer and its support to float in the water in a more or less vertical position especially for the purpose of providing that the bulb of the thermometer be submerged to a greater depth below the surface of the liquid than occurs in some forms of floating indicating devices in which the bulb merely touches the surface of the liquid.

Another object of the invention is to provide in a device of the character referred to which employs a transparent tube to enclose the indicating device, an arrangement whereby a portion of the tube acts as a weight to maintain the tube in an upright or vertical position in the liquid, thereby eliminating the necessity of employing an additional float or weight for the purpose.

In the accompanying drawing:

Fig. 1 is a side elevation of the device.

Fig. 2 is an enlarged vertical section taken on the line 2—2 of Fig. 1.

Fig. 3 is a vertical section on the line 3—3 of Fig. 2.

Fig. 4 is a transverse section on the line 4—4 of Fig. 3.

Fig. 5 is a transverse section on the line 5—5 of Fig. 3.

Fig. 6 is a view partly in vertical section and partly in elevation of the device shown floating in a liquid, the view being on a slightly smaller scale than Figs. 2 and 3.

Fig. 7 is an elevation on the same scale as Fig. 1 of a thermometer stem to which is attached an improved scale card which is shown in its flat condition.

Fig. 8 is a view showing on an enlarged scale some of the parts shown in Fig. 5.

Referring to the drawing, I represents a thin-walled supporting tube for the thermometer. The tube I is formed of thin glass and is entirely closed at one end 2 and is open at the other end 3.

An assembly unit composed of an ordinary straight thermometer stem 4 having the usual bulb 5, a scale card 6 and a plug 7 preferably formed of resilient soft rubber is assembled as follows: Through an opening in the plug 7, which is in the form of a disk, the stem of the thermometer is thrust until in the present case, about three-quarters of its length extends on one side of the disk, leaving the other quarter (the bulb end) extending on the opposite side. The scale card 6 is attached to the upper, longer portion of the stem by clips 8.

The unit thus formed is assembled into the interior of the tube I. The opening in the plug 7 through which the stem of the thermometer is inserted is slightly smaller than the stem whereby a fluid-tight fit is formed between the plug and stem. Also, the plug is sufficiently larger in diameter than the internal diameter of the tube I to provide a fluid-tight joint between the outer edge of the plug and the inner surface of the wall of the tube. By the fluid-tight joints mentioned it is insured that there will be no leakage of fluid to the space S in the upper, closed end of the tube I.

If the device is dropped in the liquid, it will float on the surface thereof, due to the buoyancy of the device, but the position will be in a horizontal plane, and the reading noted will not be an accurate indication of the temperature of the main body of the liquid. In order that the bulb may be submerged more deeply, this device may be made to float in a vertical, or nearly vertical position, by holding the device under the surface of the liquid in such manner as to allow liquid to flow into the space S' below the plug 7 within the lower end walls of the tube, displacing the air therein. The vertical position assumed by the device when so placed in the liquid insures that the bulb, which as seen is closely adjacent the extreme lower end of the tube I will be entirely immersed in liquid and also that the scale is more easily read, as the upper portion of the device projects above the surface of the liquid.

In the present drawing, the scale is shown as being graduated between the temperatures of 90 and 100 degrees F. only, the instrument being intended to test a liquid used in a process where best results are obtained only when the temperature is shown to fall within the graduated portion of the scale. Another advantage for the device may be mentioned resulting from its construction when it is explained that at such temperatures so near blood heat, that the bodily heat of the user cannot affect the reading, partly because the thermometer, more especially the bulb, is not touched by the hands, and also because if the device is handled at all, contact is made only with the tube 1. Obviously, other scales or graduations for other temperatures may be supplied for the device, or by minor changes, the device may be employed to determine other characteristics of a liquid, such as the specific gravity thereof, without departing from the spirit of the invention.

By the arrangement described, after the open end of the tube beneath the plug has become filled with water, that portion of the tube acts as a weight to maintain the buoyant part of the tube above the plug in a vertical position in the liquid, thereby permitting the manufacturing of a floating indicating instrument at less cost than when floatable bases or weights of some character are added to the device.

The previously mentioned scale indicated at 6 is an improvement over earlier forms of scales in that concealment of the clinched free ends 8' of the thermometer clips 8 is made and the cost of printing is reduced as will be described.

From the description and the drawing it is clear that both sides of any scale employed in the device are exposed to view. It will also be clear that if a single thickness scale card is used, and is clipped to the thermometer stem by the ordinary clips 8, the side of the card opposite the scale side will be rendered comparatively unsightly by the clinched ends of the clips. To conceal such ends, the improved scale is a folding card, being cut out of a sheet of material to the outline shown in Fig. 7. The broken line 6ᵃ is a score to facilitate folding whereby the half 6'' folds over on the mating half 6' of the card 6. Since the half 6' is secured to the thermometer stem by the clips, the half 6'' conceals the ends 8' of the clips when the card is properly folded (Fig. 8).

Another advantage in this form of scale card is found when it is advisable to print both sides of the card which is to be employed in the instrument, as is often the case when manufacturing process thermometers where a scale is printed on one side and an advertisement is printed on the other side, of the card. If a single thickness card, or a two piece card is used, printing as above mentioned requires that the single piece be handled twice, or that each part of the two piece card be handled; and further, there is the labor of assembling the two-piece card. It is clear that when the present foldable card is in its flat condition that both halves thereof may be printed at the same time with the expense being limited to one handling.

Having thus described my invention, I claim:

1. In a device for indicating the temperature of liquids, a transparent tube closed at one end and open at the other, a fluid-tight plug in said tube near the open end thereof, a thermometer stem extending through said plug with a fluid-tight fit, the major portion of said stem being above the plug and a minor portion thereof below the plug, and a scale cooperating with that portion of the thermometer stem located in the tube between the plug and the closed end thereof.

2. In a device for indicating the temperature of liquids, a transparent tube closed at one end and open at the other, means at a point removed from the open end of the tube to seal the closed end of the tube against the passage thereto of liquid, a thermometer stem extending through said sealing means with a liquid-tight fit, with the major portion of said stem located in said tube between the sealing means and the closed end thereof and the minor portion thereof located in the tube between the sealing means and the open end thereof, that portion of the tube between the sealing means and the open end thereof being adapted to have a portion at least of the air therein displaced by liquid when the tube is immersed therein to cause that portion of the tube to act as a weight to maintain the tube upright in said liquid.

3. In a device for indicating the temperature of liquids, a cylindrical glass tube of uniform diameter throughout having one end closed and the other end open, a plug insertable in the open end of the tube to seal the major portion of the tube against the passage of liquid, a thermometer tube insertable through said plug with a liquid-tight fit and having its indicating portion located in the tube between the plug and the closed end thereof with the thermometer bulb located in the tube between the plug and the open end thereof, that portion of the tube between the plug and the open end thereof being adapted to have a portion at least of the air displaced therein by liquid when said tube is immersed in the liquid to cause that portion of the tube between the plug and its open end to act as a weight to maintain the tube in an upright position.

4. A thermometer including a transparent tube and a thermometer stem therein, a chart for the thermometer stem composed of a single card folded upon itself to form two similar flat sections which lie in face to face contact throughout substantially their areas, said sections being of a width equalling that of the diameter of the tube whereby to prevent tilting of the chart, and means for securing the thermometer stem to the front section of the card, said means terminating forwardly of the outer face of the rear section of the card thereby to conceal the rear of said securing means.

5. A thermometer in accordance with claim 4, wherein the securing means consists of clips which have central portions embracing the stem and free ends which extend through the front section of the card and are clinched on the rear side thereof and which are concealed and held in place by the rear section of the card.

6. A thermometer in accordance with claim 4, wherein the top of the tube is rounded, and the tops of the sections are each rounded to conform to the rounded top of the tube, and lie adjacent to the latter.

JOHN L. CHANEY.